O. J. LEHRACK.
FLOW LINE SWITCH FOR ELEVATORS.
APPLICATION FILED JAN. 17, 1921.
1,434,660. Patented Nov. 7, 1922.
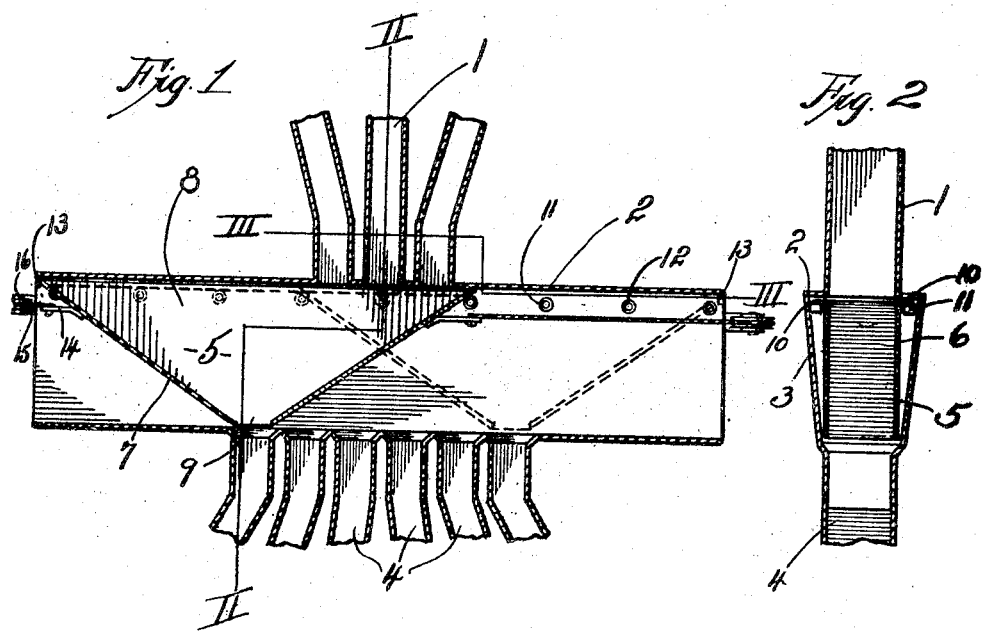
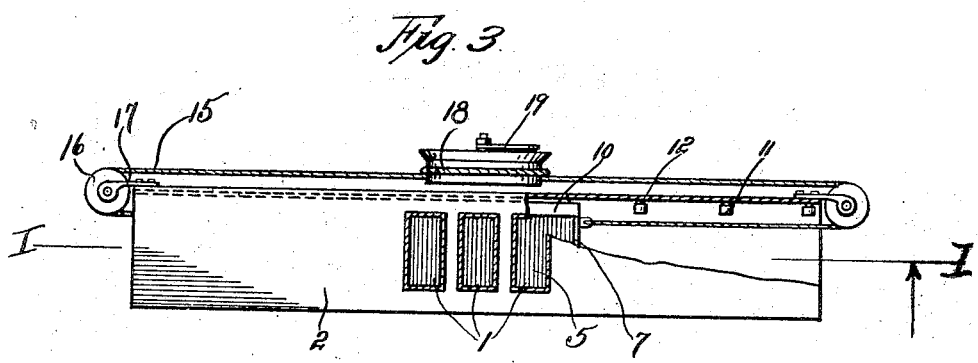
Witness:
R. E. Hamilton
INVENTOR:
O. J. Lehrack
BY
Thorpe & Gerard
ATTORNEYS.

Patented Nov. 7, 1922.

UNITED STATES PATENT OFFICE.

OTTO J. LEHRACK, OF KANSAS CITY, MISSOURI.

FLOW-LINE SWITCH FOR ELEVATORS.

Application filed January 17, 1921. Serial No. 437,784.

*To all whom it may concern:*

Be it known that I, OTTO J. LEHRACK, citizen of the United States, and resident of Kansas City, county of Jackson, State of Missouri, have invented a certain new and useful Improvement in Flow-Line Switches for Elevators, of which the following is a complete specification.

This invention relates to flow line switches for use in grain elevators or other constructions employing similar operations, and has for its object to produce a device of this character whereby the flow of grain or other material may be distributed from a source of supply into any one of a series of containers, and also of such a nature that grains of different character, as when preparing a mixed feed, may be fed from a series of separate sources and upon their entry into the hopper composing the switch may be mixed and discharged into a single container.

A still further object is to produce a device of this character of simple, strong, durable, efficient and inexpensive construction; and in order that it may be fully understood, reference may be had to the accompanying drawing, in which:—

Figure 1 is a central vertical section taken through the hopper and its communicating pipes on the line I—I of Figure 3.

Figure 2 is a section on the line II—II of Figure 1; and

Figure 3 is a broken sectional view taken on the line III—III of Figure 1.

In the said drawing, where like reference characters identify corresponding parts in all of the figures, 1 indicates a series of feed pipes leading from any sources of supply and communicating with a guide box 2, having downwardly and inwardly sloping side walls 3 and being open at its ends, as shown in Figure 2. Communicating with the guide box through the bottom thereof are a series of discharge pipes 4, the opposite ends of the pipes being in communication with suitable receptacles.

Fitting within the guide box, and free from endwise movement therein, is a distributing hopper 5 formed with vertical side walls 6 and downwardly and inwardly sloping end walls 7 forming a receiving mouth 8 for the hopper of a size sufficient to remain in continuous register with all of the feed pipes 1, regardless of the hopper's position, and forming at its bottom a discharge mouth 9 of sufficient size to register with but one of the discharge pipes 4 at a time.

In order that the hopper may be freely and easily moved from register with one of the discharge pipes into register with another, its side walls 6 are formed with outwardly projecting flanges 10 along their upper edges, which are adapted to overlie and be supported by a series of rollers 11 mounted on pins 12, secured to the side walls 3 of the guide box in any suitable manner. It will be understood that it will be necessary to limit the endwise travel of the hopper in order that it may continuously register with all of the feed pipes 1, and for performing this function the top of the guide box may be formed at its ends with downwardly extending stop flanges 13 for abutment by the end walls 7 of the hopper.

Any preferred control apparatus may be adopted for convenience in changing the position of the hopper and indicating such position at all times. The control apparatus herein shown consists of a pair of perforated plates 14 secured in any suitable manner to the end walls of the hopper near one side thereof, and secured in the perforations of the plates are the opposite ends of a cable 15 threaded over guide sheaves 16, pivotally mounted in bifurcated brackets 17 secured in any suitable manner at opposite ends of one side wall of the guide box. The cable 15 then passes around an indicator drum 18 which is located at any desired point. The face or dial of the drum, not shown, is supplied with a series of indicating marks, which will show, in conjunction with the index arm 19 of the drum, the exact position of the discharge mouth of the hopper within the guide box.

From the foregoing it will be seen that I have devised a practical and efficient construction for carrying out the desired objects of the invention. The hopper 5, by manipulation of the cable 15, may be shifted in either direction for bringing the discharge mouth 9 thereof into selective communication with any one of the discharge pipes 4, while the size of the receiving mouth of the hopper is obviously sufficient to remain at all times in communication with all the feed pipes 1. Thus material may be received into the hopper from any one of the feed pipes 1 and discharged into any one of the discharge pipes 4 by appropriate positioning of the hopper 5; or, in case a mixed product is to be obtained, the different ingredients may be fed through two or more of the pipes 1 into the hopper and mingled therein and discharged thereby into the proper discharge pipe 4, the position of the hopper being regulated accordingly. The construction is extremely simple and comprises no parts likely to get out of order, and the operation is readily effected by the convenient manipulation of the cable 15 for controlling the position of the hopper. While I have illustrated and described what I now regard as the preferred form of construction for embodying the improvement, I desire to reserve the right to make such changes or modifications as may fairly fall within the scope of the appended claims.

I claim:—

1. In a device of the character described, a feed pipe, a series of discharge pipes, a horizontal hopper guide, and a hopper mounted for back and forth movement in said guide into selective communication with said discharge pipes.

2. In a device of the character described, a horizontal hopper guide, a feed pipe and a series of discharge pipes in communication with said hopper guide, a hopper mounted for sliding movement within said guide, and means whereby the discharge mouth of the hopper may be placed in communication with any one of said series of discharge pipes.

3. In a device of the character described, a hopper guide, a feed pipe and a series of discharge pipes in communication with the upper and lower sides, respectively, of said hopper guide, the side walls of said hopper guide being provided with inwardly projecting supporting means, a hopper mounted for sliding movement on said supporting means, and means whereby the position of the hopper may be varied for discharge into any of said series of discharge pipes.

4. In a device of the character described, a hopper guide, the upper side of said hopper guide being provided with an opening, a feed pipe in communication with said opening, the lower side of said hopper guide being provided with a series of openings, a series of discharge pipes in communication with said openings, a series of roller bearings projecting inwardly from the sides of the hopper guide, a hopper provided with outwardly projecting side flanges adapted to be supported by said roller bearings, and means whereby the position of the hopper may be varied in either direction.

5. The combination with a grain delivery trip having oppositely disposed grain delivery chutes in the bottom thereof, of a hopper slidable transversely of the trip and having an opening in the bottom co-extensive with the opening of one of the delivery chutes whereby when the hopper is in alignment with one of the delivery chutes the other delivery chute will be cut off from effective communication with the trip and vice versa.

6. The combination with a casing having oppositely inclined delivery chutes, of a sliding valve member in the casing having inclined bottom members spaced apart at their lower ends to provide an opening to deliver into the delivery chutes, and means for sliding the valve member so that the opening in the sliding valve member may register with either delivery chute.

7. A casing provided with oppositely inclined delivery chutes, a trough-shaped member slidable within the casing and substantially the width thereof, the trough-shaped member having an opening in its bottom co-extensive with the opening in a delivery chute, and means for operating the trough-shaped member.

In witness whereof I hereunto affix my signature.

OTTO J. LEHRACK.